2,846,455
Patented Aug. 5, 1958

2,846,455

ESTRADIOL-17-HEXAHYDROBENZOATE AND METHOD OF MAKING SAME

Georges Muller, Nogent-sur-Marne, France, assignor to Les Laboratoires Francais de Chimiotherapie, Paris, France, a corporation of France No Drawing. Application January 20, 1956
Serial No. 560,428

Claims priority, application France January 25, 1955

3 Claims. (Cl. 260—397.5)

This invention relates to estradiol-hexahydrobenzoates of the general formula

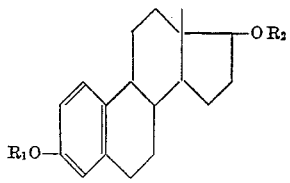

wherein $R_1$ represents H, acyl or hexahydrobenzoyl, $R_2$ represents H or hexahydrobenzoyl, and wherein at least one of $R_1$ and $R_2$ must be hexahydrobenzoyl. Estradiol-3-hexahydrobenzoate, estradiol-3,17-dihexahydrobenzoate and estradiol-17-hexahydrobenzoate are new esters having unusual properties. They are injectable estrogens whose action lasts a long time. Tests carried out on ovariectomized rats have proved that the new esters of this invention bring about estrus manifestations which last much longer than those observed with the strongest estrogens previously used. Thus, estradiol-17-hexahydrobenzoate, for example, causes an average estrus period of 11 days, while estradiol-3-benzoate acts for three days only at a dosage of 10γ. The products obtained according to this invention can be used in human as well as in veterinary medicine.

Estradiol-3-hexahydrobenzoate and estradiol-3,17-dihexahydrobenzoate are prepared by causing a hexahydrobenzoyl halide, such as hexahydrobenzoyl-chloride or -bromide, to react with a solution of estradiol, in a suitable solvent and by isolating the monoester or diester thus formed. Instead of a hexahydrobenzoyl halide, the corresponding anhydride may be used.

In order to attain monoesterification in the 3-position, it is advisable to operate according to Schotten Baumann, the solvent being, for example, acetone, and the base being an alkali hydroxide, such as sodium hydroxide, in aqueous solution.

Diacylation in the 3,17-position is carried out in the presence of a tertiary base, such as pyridine, 2-methyl-5-ethyl pyridine or dimethylaniline. After the reaction, the solution is taken up in a water-immiscible solvent, such as ether, benzene, and others. The solution thus obtained, is washed with an acidic agent in order to eliminate excess tertiary base, then with an alkaline agent in order to remove excess acid or unreacted acid chloride, and, finally, with water. The solvent is distilled off, after the solution has been dried and the diester is recrystallized from a suitable solvent.

Estradiol 17-hexahydrobenzoate is prepared from the 3,17-diester by means of selective hydrolysis with a suitable aqueous base such as sodium hydroxide or an alkali carbonate, at a temperature varying between room temperature and refluxing temperature, in a water-miscible solvent for 3,17-dihexahydrobenzoate, such as a lower aliphatic alcohol, preferably ethanol or methanol.

Estradiol 17-hexahydrobenzoate can be directly obtained, without isolation of the intermediate 3,17-dihexahydrobenzoate, by reacting estradiol with hexahydrobenzoic anhydride in a suitable, water-immiscible solvent, such as chloroform, in the presence of para-toluenesulfonic acid. After washing with water and concentrating, the solution is treated with ammonia and is extracted to obtain the desired 17-monoester.

In the alternative, the process can be started with the estrone converted into a suitable, easily hydrolyzable derivative, such as the methoxymethylic ether. The keto-function in the 17-position of this derivative is reduced to a secondary hydroxyl by means of suitable agents, such as sodium and alcohol, and alkaline boron hydride or hydrogen in the presence of a catalyst. The hydroxyl in the 17-position is then acylated by means of a hexahydrobenzoyl halide or hexahydrobenzoic anhydride in the presence of a suitable condensing agent and, finally, the phenolic hydroxyl in the 3-position is liberated by a treatment that will not affect the desired ester, for example, by boiling in the presence of a diluted mineral acid.

It is also possible to acylate estradiol in the 3-position and to treat the 3-acyl-estradiol thus obtained with a hexahydrobenzoyl halide or with hexahydrobenzoic anhydride, as previously set forth, and to selectively hydrolyze the resulting 3,17-diester, provided, however, that the acyloxy group in the 3-position is more readily saponified than the hexahydrobenzoyloxy group in the 17-position. This latter method results in intermediate 3-acyl-17-hexahydrobenzoyl-estradiols which exhibit interesting, retarded estrogen properties and which, may be also prepared by a suitable acylation of estradiol-17-hexahydrobenzoate.

These new esters may be used as solutions in neutral vegetable oil, to which a glycol may be added if desired, or they may be dissolved in other injectable solvents. The concentrations, which may be varied, are limited only by the solubility. Thus, solutions have been prepared that contain 10 mg. of 3,17-dihexahydrobenzoate and 20 mg. of 3- and of 17-monohexahydrobenzoate-estradiol, respectively, per cc. of olive oil. It is sometimes advisable to add to the oily solutions a monostearate or aluminum 2-ethyl-hexanoate in order to obtain a thixotropic gel. The estradiol esters of this invention can be also administered in the form of microcrystalline aqueous suspensions or emulsions in water of solutions in a solvent in the presence of a neutral and non-irritating agent. These preparations are made by means of well-known procedures.

The following examples are presented to illustrate the invention but not to limit the scope thereof in any way.

EXAMPLE 1

*The 3-hexahydrobenzoate of estradiol starting from estradiol*

7.5 g. of estradiol are dissolved in 50 cc. of acetone and 26 cc. of a solution of hexahydrobenzoyl chloride in acetone (20%) and 66 cc. of normal sodium hydroxide solution are added at ambient temperature. After standing for half an hour 20 cc. of normal sodium hydroxide solution and then 10 cc. of hexahydrobenzoyl chloride in acetone (20%) are added. This operation is repeated after a further half hour of standing but this time 10 cc. of normal sodium hydroxide solution and 10 cc. of the chloride in acetone are added. The reaction mixture is run into 200 cc. of water, filtering with suction is effected and drying in a vacuum. In this way 8.75 g., corresponding to a yield of 81%, of the 3-hexahydrobenzoate of estradiol are obtained; this material is recrystallised from ethanol. The product which is new, melts at 91–92° C. on a block, $[\alpha]_D^{20} = +53° \pm 1$ (1% concentration in chloroform). It is present in the form of colourless plates which are soluble in ether, acetone and chloroform, sparingly soluble in cold alcohol, insoluble in water.

Analysis.—$C_{25}H_{34}O_3=382.52$. Calculated: C percent 78.5, H percent 9.0. Found: C percent 78.6, H percent 8.9.

EXAMPLE 2

The 3,17-dihexahydrobenzoate of estradiol starting from estradiol 15 g. of estradiol are dissolved in 150 cc. of anhydrous pyridine, the resulting solution is brought to 5° C. and 30 cc. of hexahydrobenzoyl chloride are added at that temperature. The material is left to stand for 15 hours at ambient temperature and 600 cc. of water are added. After standing for 15 minutes extraction with 600 cc. of chloroform is effected. The chloroform extract is washed with dilute hydrochloric acid, water, bicarbonate of sodium and water, is dried over magnesium sulphate and evaporated to dryness in a vacuum. The residue is taken up in 400 cc. of hot acetone from which it crystallises by cooling. In this way 25.9 g., corresponding to a yield of 95%, of the 3,17-dihexahydrobenzoate of estradiol are obtained. This material is recrystallised from acetone. The product which has not yet been described melts at 182–183° C. on a block, $[\alpha]_D^{20}=+33°$ (0.5% concentration in chloroform). It is present in the form of elongated colourless prisms, is soluble in chloroform, sparingly soluble in cold alcohol, ether and acetone, insoluble in water.

Analysis.—$C_{32}H_{44}O_4=492.67$. Calculated: C percent 78.0, H percent 9.0, O percent 13.0. Found: C percent 78.1, H percent 8.9, O percent 13.3.

EXAMPLE 3

The 17-hexahydrobenzoate of estradiol by hydrolysis of the 3,17-dihexahydrobenzoate of estradiol 12 g. of the 3,17-dihexahydrobenzoate of estradiol obtained according to the preceding example are dissolved in 700 cc. of ethanol, 40 cc. of normal sodium hydroxide solution are added and the material is brought to reflux for 4 hours. After cooling the alcohol is eliminated by distillation, 800 cc. of water are added and acidification to a pH value of 2 is effected by means of concentrated hydrochloric acid. Extraction with chloroform is effected, the chloroform extracts are united and washed with water, then with sodium bicarbonate and again with water; the washed extracts are dried over magnesium sulphate and evaporated to dryness. In this way 6.6 g., corresponding to a yield of 71%, of a resin are obtained which is crystallised from benzene by the addition of petroleum ether. The product which is new, melts at 174° C. on a block, $[\alpha]_D^{20}=+45°\pm1$ (1% concentration in chloroform) and gives in methanol a solvate having a melting point of 100° C. It is present in the form of small colourless crystals which are soluble in ether, acetone, benzene and chloroform, sparingly soluble in cold methanol, insoluble in water. Crystallisation from aqueous methanol gives another crystalline from having a melting point 154–155° C.

Analysis.—$C_{25}H_{34}O_3=382.52$. Calculated: C percent 78.5, H percent 9.0, O percent 12.5. Found: C percent 78.6, H percent 8.9, O percent 12.6.

EXAMPLE 4

The 17-hexahydrobenzoate of estradiol starting from estradiol 1 g. of estradiol is dissolved in 20 cc. of chloroform, 4 cc. of hexahydrobenzoic anhydride and 200 mg. of p-toluene-sulphonic acid are added and the solution is left to stand for 72 hours at ambient temperature. Washing with water is effected, drying over magnesium sulphate and the resulting material is concentrated to a small volume in a vacuum. The concentrate is heated over a water bath for 4 hours with 50 cc. of ammonia. Cooling is effected, extraction with ether, the ethereal extract is washed with water, dried over magnesium sulphate and brought to dryness in a vacuum. The residue is crystallised from benzene/petroleum ether and gives the 17-hexahydrobenzoate of estradiol with a yield of 60%.

EXAMPLE 5

The 17-hexahydrobenzoate of estradiol starting from estrone 27 g. of estrone are dissolved in 200 cc. of hot anhydrous dioxane, the solution is brought to boiling, 110 cc. of sodium ethoxide are added and, after cooling, 80 cc. of a solution of monochlorinated dimethyl ether (10%). After 15 minutes standing a further 110 cc. of sodium ethoxide are added and then 80 cc. of the monohalogenated ether solution, and this operation is repeated a third time after a further quarter hour standing. The material is left to stand for 30 minutes at ambient temperature, dilution with benzene is effected and the material is stirred with 1 volume of normal sodium hydroxide solution. The benzene solution is dried over magnesium sulphate and evaporated to dryness in a vacuum. The residue crystallises from petroleum ether. The melting point of the crystalline substance is 100° C.

The crystals (29.2 g.) are dissolved in one litre of absolute alcohol and reduction is effected with 50 g. of sodium at an elevated temperature. Precipitation is effected by the addition of water, the material is taken up in ether, the ethereal extract is washed with water, dried and evaporated to dryness. In this way 26.3 g. of the methoxymethyl ether of estradiol are obtained which are dissolved in 150 cc. of pyridine with 35 g. of hexahydrobenzoic anhydride. The material is brought to reflux for 2 hours, a little water is added in order to destroy the excess of the anhydride, the material is left to stand and extracted with ether after cooling. The ethereal solution, after washing with dilute hydrochloric acid, sodium carbonate and then water, is dried and evaporated to dryness. The residue is taken up in a mixture of 150 cc. of absolute alcohol and 15 cc. of concentrated hydrochloric acid and the resulting solution is brought to reflux for 1 minute. Precipitation is effected by pouring in water, extraction with ether is carried out, the extract is washed with water, dried and evaporated to dryness. The residue is crystallised from benzene/petroleum ether and gives the 17-hexahydrobenzoate of estradiol. The yield of this product is 25 g.

EXAMPLE 6

The 3-benzoyl ester of the 17-hexahydrobenzoate of estradiol starting with the 3-benzoate of estradiol A solution of 3.2 g. of the 3-benzoate of estradiol in 32 cc. of anhydrous pyridine is cooled to 0° C., 2.7 cc. of hexahydrobenzoyl chloride are then added and the material is left to stand for 16 hours at ambient temperature. After the addition of 30 cc. of water, extraction with 90 cc. of chloroform is effected. The chloroform extracts are washed with normal hydrochloric acid, sodium bicarbonate and then water, the material is dried over magnesium sulphate and evaporated to dryness in a vacuum. The residue is dissolved in hot acetone and, after cooling of the solution, filtering and filtering with suction, there are obtained 3.5 g. (86%) of colourless needles, melting point 206° C., $[\alpha]_D^{20}=30°\pm1°$ (1% concentration in chloroform). The product, which is new, is insoluble in water, alcohol, soluble in 100 volumes of hot acetone and very soluble in chloroform.

Analysis.—$C_{32}H_{38}O_4=486.6$. Calculated: C percent 79.0, H percent 7.9, O percent 13.2. Found: C percent 79.0, H percent 7.9, O percent 13.6.

The 3-benzoyl ester of the 17-hexahydrobenzoate of estradiol produced above, after hydrolysis under the conditions of Example 3, gives the 17-hexahydrobenzoate of estradiol, melting point 154–155° C., which is identical with an authentic sample of this product.

The foregoing examples illustrate the invention without however, limiting it. In particular it is possible to vary the nature of the solvents, the condensation agents or hydrolysis agents, as well as the temperatures at which the reactions are effected without going outside the scope of the present invention. For example, in order to obtain the 3-hexahydrobenzoate of estradiol from the 3-hexahydrobenzoate of estrone, it is possible to reduce the 17-keto group to give a secondary hydroxy group by a process which does not affect the remainder of the molecule, for example by means of an alkali metal borohydride.

Having thus described the invention, what is claimed is:

1. Estradiol-17-hexahydrobenzoate.
2. The process of producing estradiol-17-hexahydrobenzoate, the steps comprising adding hexahydrobenzoic anhydride in the presence of a para-toluene-sulfonic acid to estradiol, treating with ammonia and isolating the resulting ester from the reaction mixture.
3. The process of producing estrodiol-17-hexahydrobenzoate, comprising the steps of reacting estrone in an anhydrous medium and in the presence of an alkaline condensation agent with a monohalogenated dialkyl ether, reducing the keto group in the 17-position by heating with sodium in absolute alcohol, condensing the estradiol-3-alkoxyalkyl ether thus obtained with hexahydrobenzoic anhydride in the presence of a tertiary base, and hydrolyzing the resulting 3-alkoxyalkyl ether of estradiol 17-hexahydrobenzoate by treating with a mineral acid.

References Cited in the file of this patent

UNITED STATES PATENTS

| | | |
|---|---|---|
| 2,033,487 | Schwenk | Mar. 10, 1936 |
| 2,233,025 | Miescher | Feb. 25, 1941 |
| 2,381,073 | Miescher et al. | Aug. 7, 1945 |
| 2,467,460 | Bennekou | Apr. 19, 1949 |
| 2,705,721 | Nysted | Apr. 5, 1955 |